United States Patent
Trummer

(10) Patent No.: US 11,885,901 B2
(45) Date of Patent: Jan. 30, 2024

(54) POLARIMETRIC RADAR AND A SUITABLE USE AND METHOD THEREFOR

(71) Applicant: ASTYX GmbH, Ottobrunn (DE)

(72) Inventor: Stefan Trummer, Taufkirchen (DE)

(73) Assignee: Cruise Munich GmbH, Ottobrunn (DE)

( * ) Notice: Subject to any disclaimer, the term of this patent is extended or adjusted under 35 U.S.C. 154(b) by 609 days.

(21) Appl. No.: 16/973,144

(22) PCT Filed: Mar. 28, 2019

(86) PCT No.: PCT/EP2019/057849
§ 371 (c)(1),
(2) Date: Dec. 8, 2020

(87) PCT Pub. No.: WO2019/233651
PCT Pub. Date: Dec. 12, 2019

(65) Prior Publication Data
US 2021/0247485 A1 Aug. 12, 2021

(30) Foreign Application Priority Data

Jun. 8, 2018 (DE) .................... 10 2018 209 131.5
Jul. 12, 2018 (DE) .................... 10 2018 211 610.5

(51) Int. Cl.
*G01S 7/00* (2006.01)
*G01S 7/02* (2006.01)
(Continued)

(52) U.S. Cl.
CPC .............. *G01S 7/006* (2013.01); *G01S 7/023* (2013.01); *G01S 7/026* (2013.01); *G01S 7/0231* (2021.05);
(Continued)

(58) Field of Classification Search
CPC ........ G01S 7/006; G01S 7/023; G01S 7/0231; G01S 7/0234; G01S 7/026; G01S 7/4026;
(Continued)

(56) References Cited

U.S. PATENT DOCUMENTS

2017/0310758 A1 10/2017 Davis et al.
2020/0412439 A1* 12/2020 Kossin ................. H01Q 21/245
2021/0026004 A1* 1/2021 Slemp .................. G01S 13/345

FOREIGN PATENT DOCUMENTS

CN 112513664 A 3/2021
DE 102008061932 7/2010
(Continued)

OTHER PUBLICATIONS

"Notification of Entering the Substantive Examination Proceeding of Patent Application for Invention for Chinese Patent Application No. 201980038253.9", dated Jun. 16, 2021, 2 pages.
(Continued)

*Primary Examiner* — Marc Anthony Armand
(74) *Attorney, Agent, or Firm* — Calfee, Halter & Griswold LLP

(57) ABSTRACT

A polarimetric radar consisting of a transmission arrangement, in which the carrier signals have a circular polarization, wherein all the transmitters of the transmission arrangement are used simultaneously and each transmitter is operated by way of a transmission signal, which is modulated by way of an individual digital phase code, a receiver arrangement, which receives the reflected signals via an antenna arrangement, wherein there are both reception antennas that are configured for left-hand circularly polarized electromagnetic waves and reception antennas that are configured for right-hand circularly polarized electromagnetic waves, wherein the use of a plurality of transmitters and receivers provides an overall arrangement, which is
(Continued)

Antenna element, embodied as a double-ridged waveguide horn for left-hand circular polarization operated in accordance with the multiple-input multiple-output method.

20 Claims, 13 Drawing Sheets

(51) Int. Cl.
  *G01S 13/42* (2006.01)
  *G01S 13/931* (2020.01)
  *H01Q 13/02* (2006.01)
  *H01Q 21/06* (2006.01)
(52) U.S. Cl.
  CPC ............ *G01S 7/0234* (2021.05); *G01S 13/42* (2013.01); *G01S 13/931* (2013.01); *H01Q 13/0241* (2013.01); *H01Q 21/064* (2013.01); *G01S 2013/9316* (2020.01)
(58) Field of Classification Search
  CPC ........ G01S 7/403; G01S 7/4034; G01S 13/42; G01S 13/931; G01S 13/0241; G01S 13/584; G01S 13/878; G01S 13/325
  See application file for complete search history.

(56) References Cited

FOREIGN PATENT DOCUMENTS

| | | |
|---|---|---|
| DE | 102013102424 | 9/2014 |
| DE | 102016101583 | 8/2017 |
| DE | 102018209131 A1 | 12/2019 |
| DE | 102018211610 A1 | 1/2020 |
| EP | 3803443 A1 | 4/2021 |
| WO | WO 2018087365 | 5/2018 |
| WO | 2019233651 A1 | 12/2019 |

OTHER PUBLICATIONS

"Office Action for European Patent Application No. 19714608.7", dated May 23, 2023, 11 pages.
Bourdoux et al., "PMCW Waveform and MIMO Technique for a 79 GHz CMOS Automotive Radar," 2016 IEEE Radar Conference (RadarConf), May 2, 2016, 5 pages.
DE Search Report in German Appln. No. 102018209131.5, dated Apr. 4, 2019, 21 pages (with Machine Translation).
DE Search Report in German Appln. No. 102018211610.5, dated Apr. 2, 2019, 23 pages (with Machine Translation).
Erhart et al., "Design and demonstration of a full polarimetric sensor for surface texture characterisation" 13th European Radar Conference, London, UK, Oct. 5-7, 2016, pp. 193-196.
PCT International Preliminary Report on Patentability in International Appln. No. PCT/EP2019/057849, dated Dec. 17, 2020, 16 pages (with English Translation).
PCT International Search Report and Written Opinion in International Appln. No. PCT/EP2019/057849, dated Jul. 9, 2019, 19 pages (with English Translation).
Sturm et al., "Automotive fast-chirp MIMO radar with simultaneous transmission in a doppler-multiplex," 19th International Radar Symposium (IRS), Jun. 20-22, 2018, Bonn, Germany, 6 pages.
Trummer et al., "A Polarimetric 76-79 GHz Radar Frontend for Target Classification in Automotive Use," Proceedings of the 46th European Microwave Conference, London, UK, Oct. 4-6, 2016, pp. 1493-1496.
"Reply to Office Action for European Patent Application No. 19714608.7", Filed Date: Oct. 21, 2021, 5 Pages.
"Request for Substantive Examination for Chinese Patent Application No. 2019800382519", Filed Date: Jun. 7, 2021, 1 Page.
"Reply to Office Action for European Patent Application No. 19714608.7", dated Sep. 22, 2023, 9 pages.

* cited by examiner

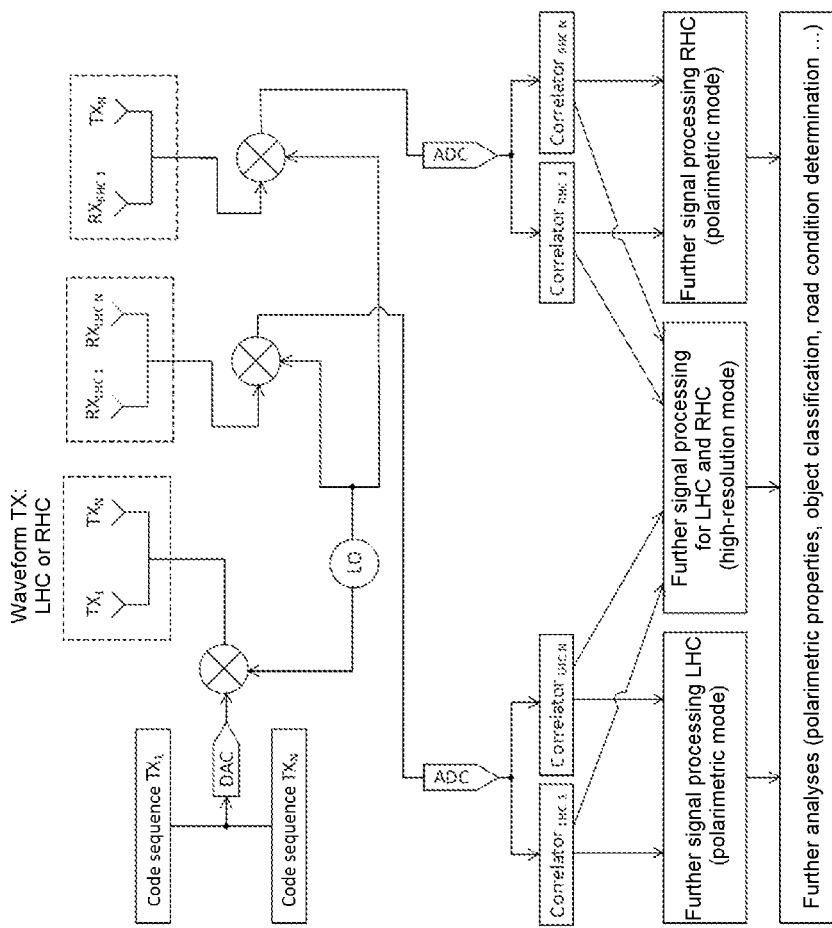
Figure 1: Transmission and reception principle

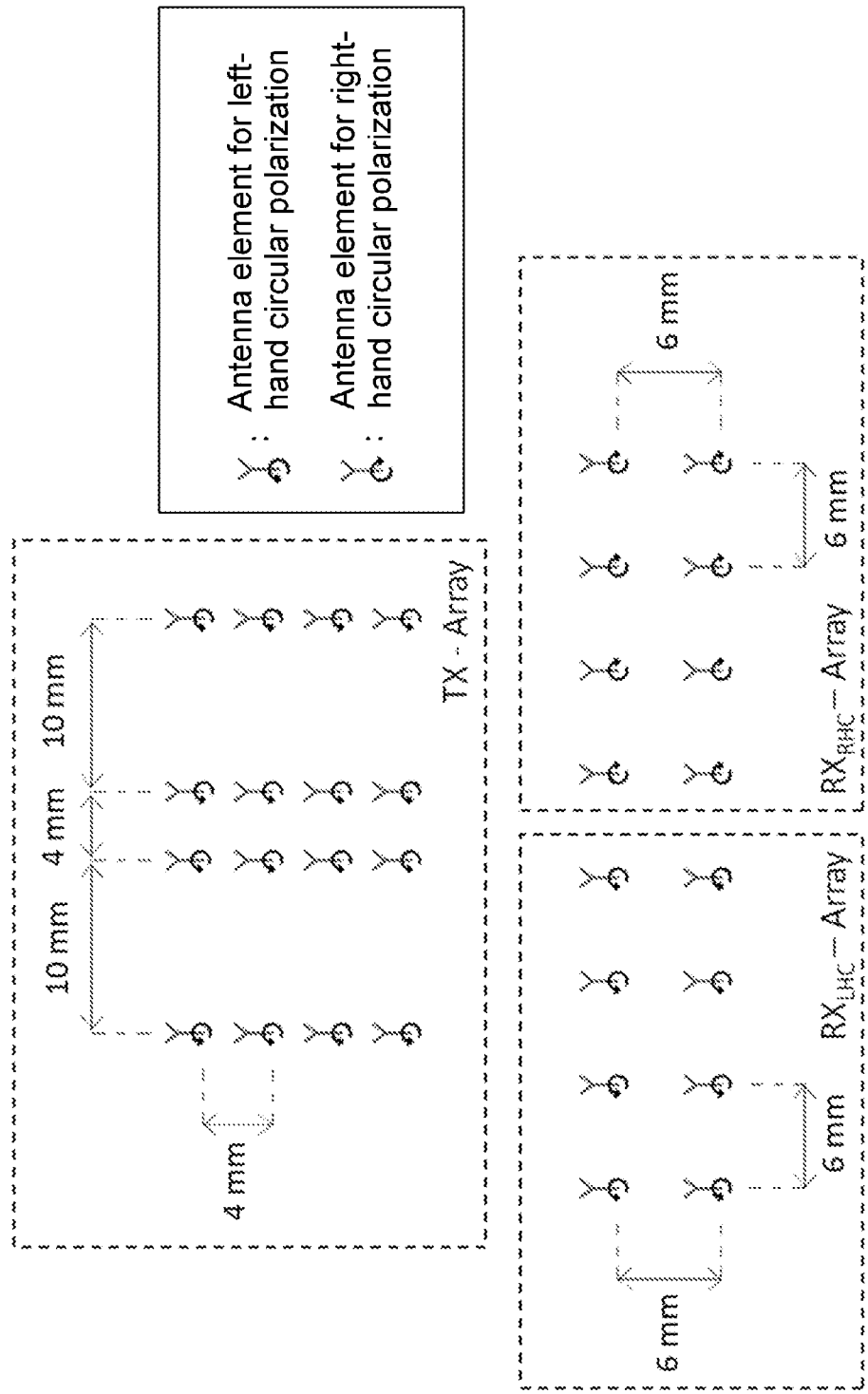
Figure 2: Exemplary transmission and reception arrangement

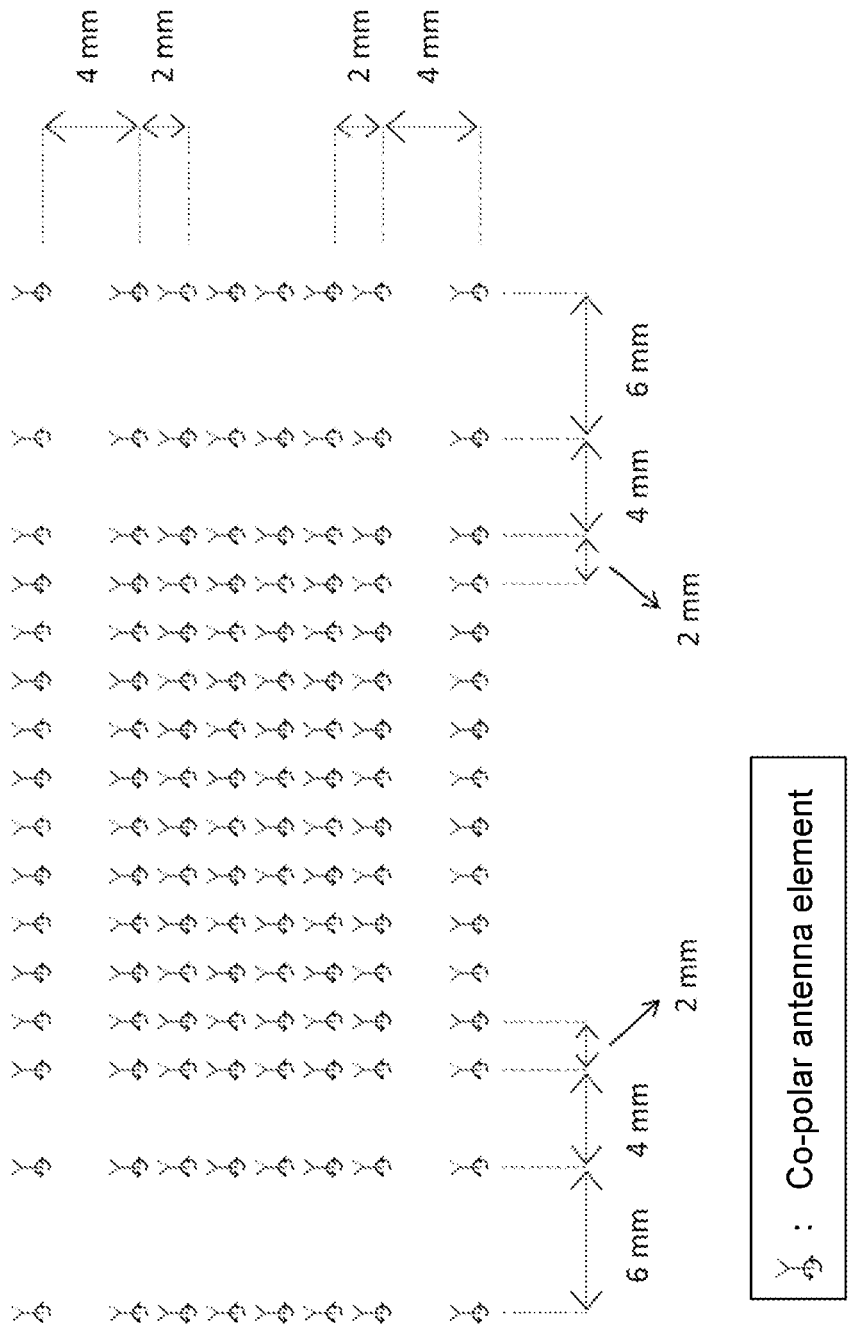
Figure 3: Co-polar overall arrangement of the polarimetric mode consisting of real and synthetic proportions

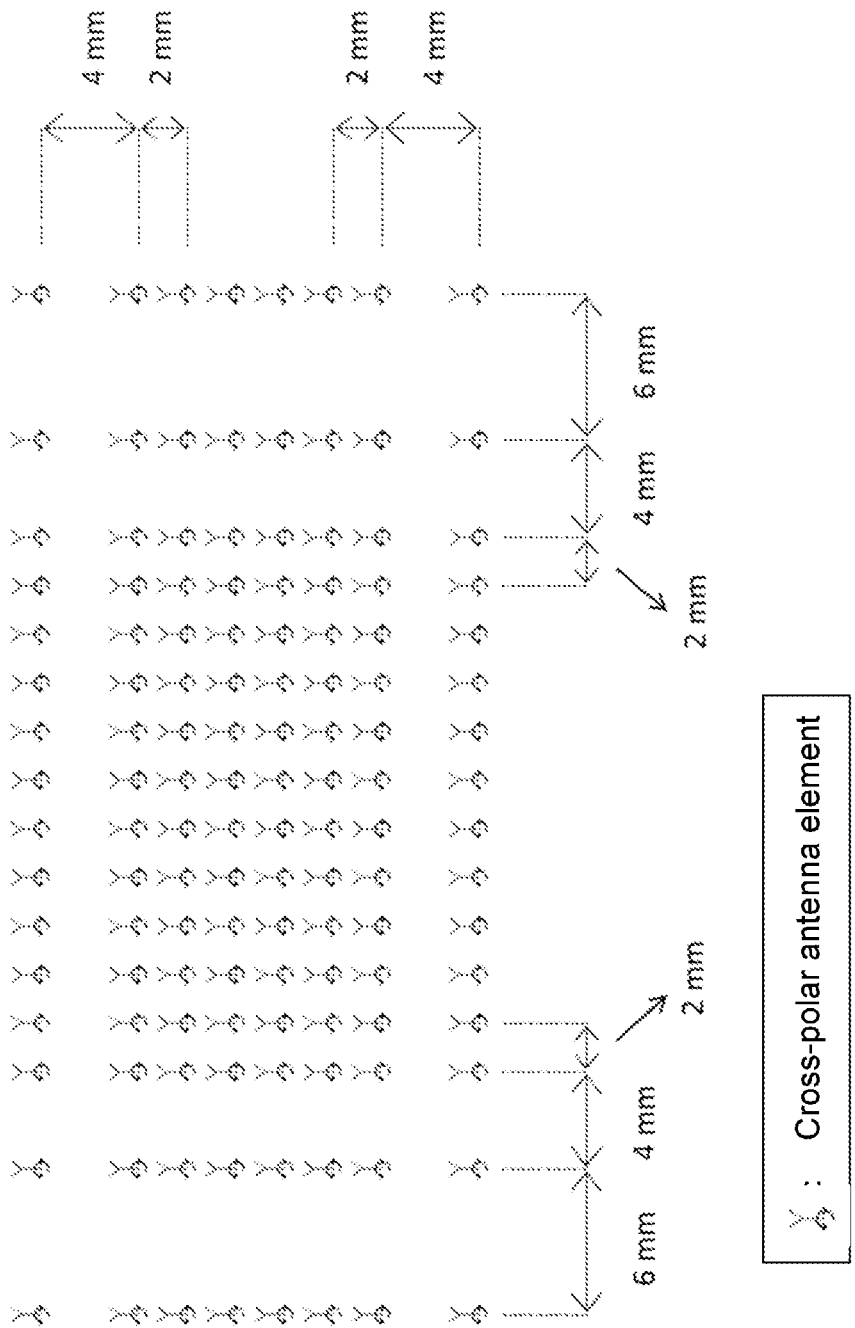
Figure 4: Cross-polar overall arrangement of the polarimetric mode consisting of real and synthetic proportions

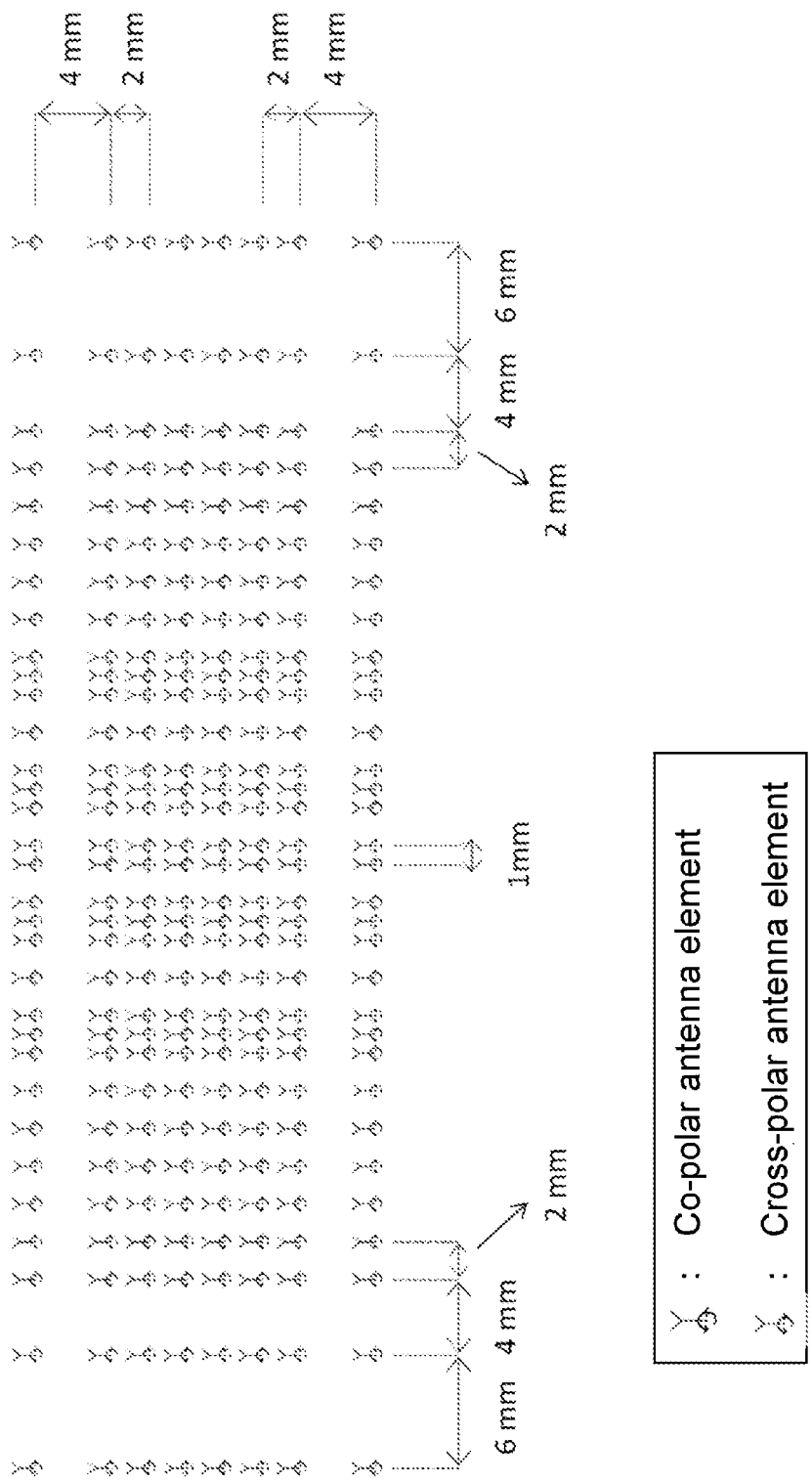
Figure 5: Overall arrangement of the mode having a high angular resolution in azimuth

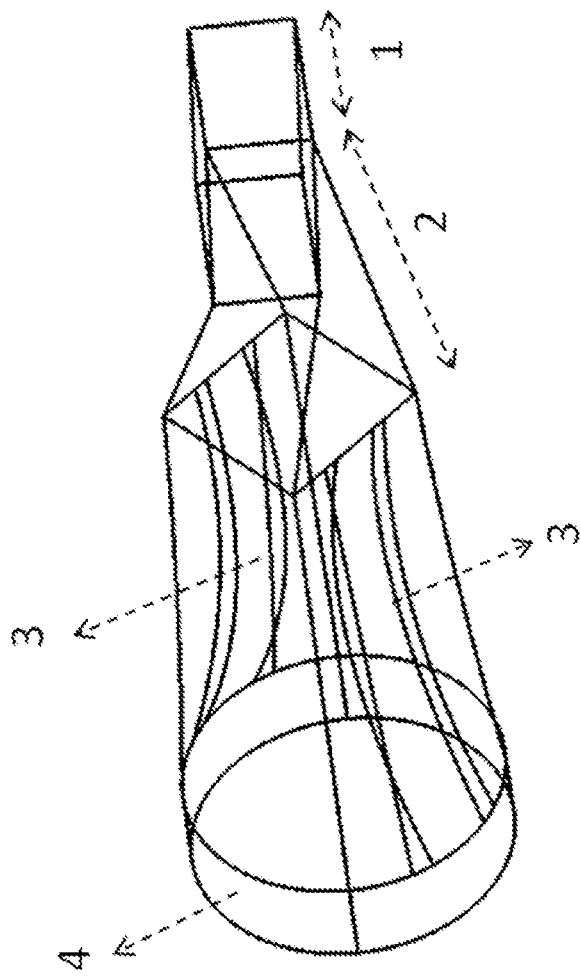
Figure 6: Antenna element, embodied as a double-ridged waveguide horn for left-hand circular polarization

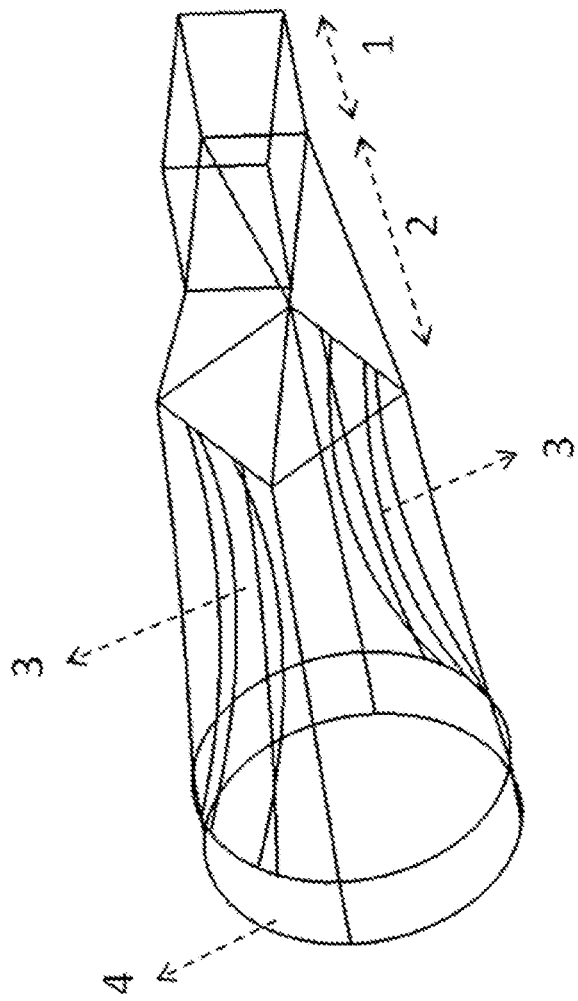
Figure 7: Antenna element, embodied as a double-ridged waveguide horn for right-hand circular polarization

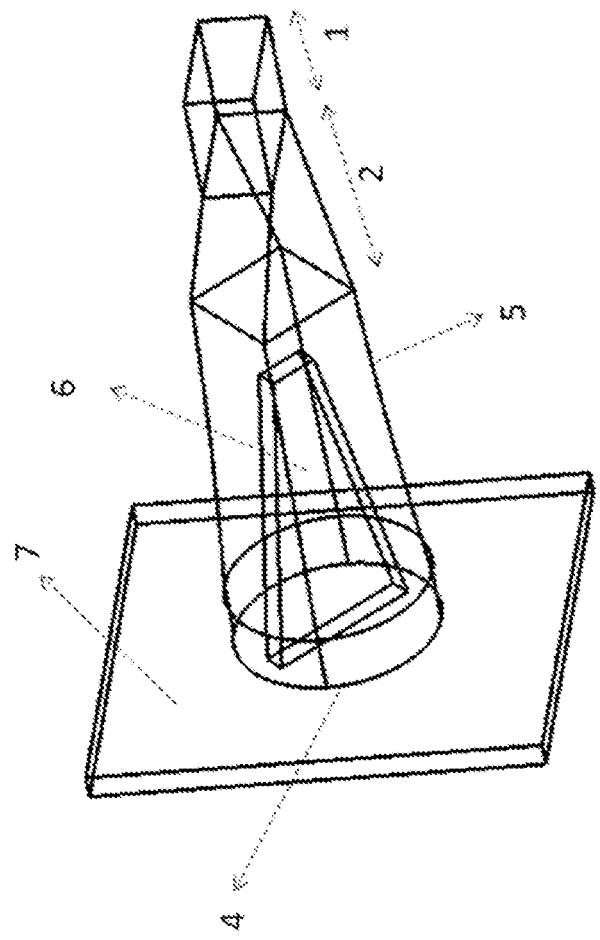
Figure 8: Antenna element, embodied as a horn antenna with integral dielectric septum for left-hand circular polarization

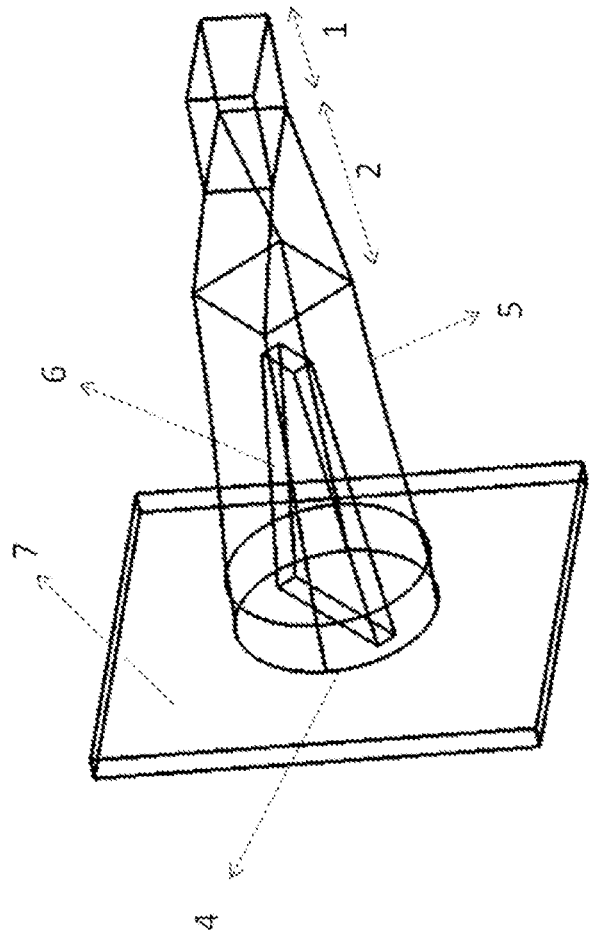
Figure 9: Antenna element, embodied as a horn antenna with integral dielectric septum for right-hand circular polarization

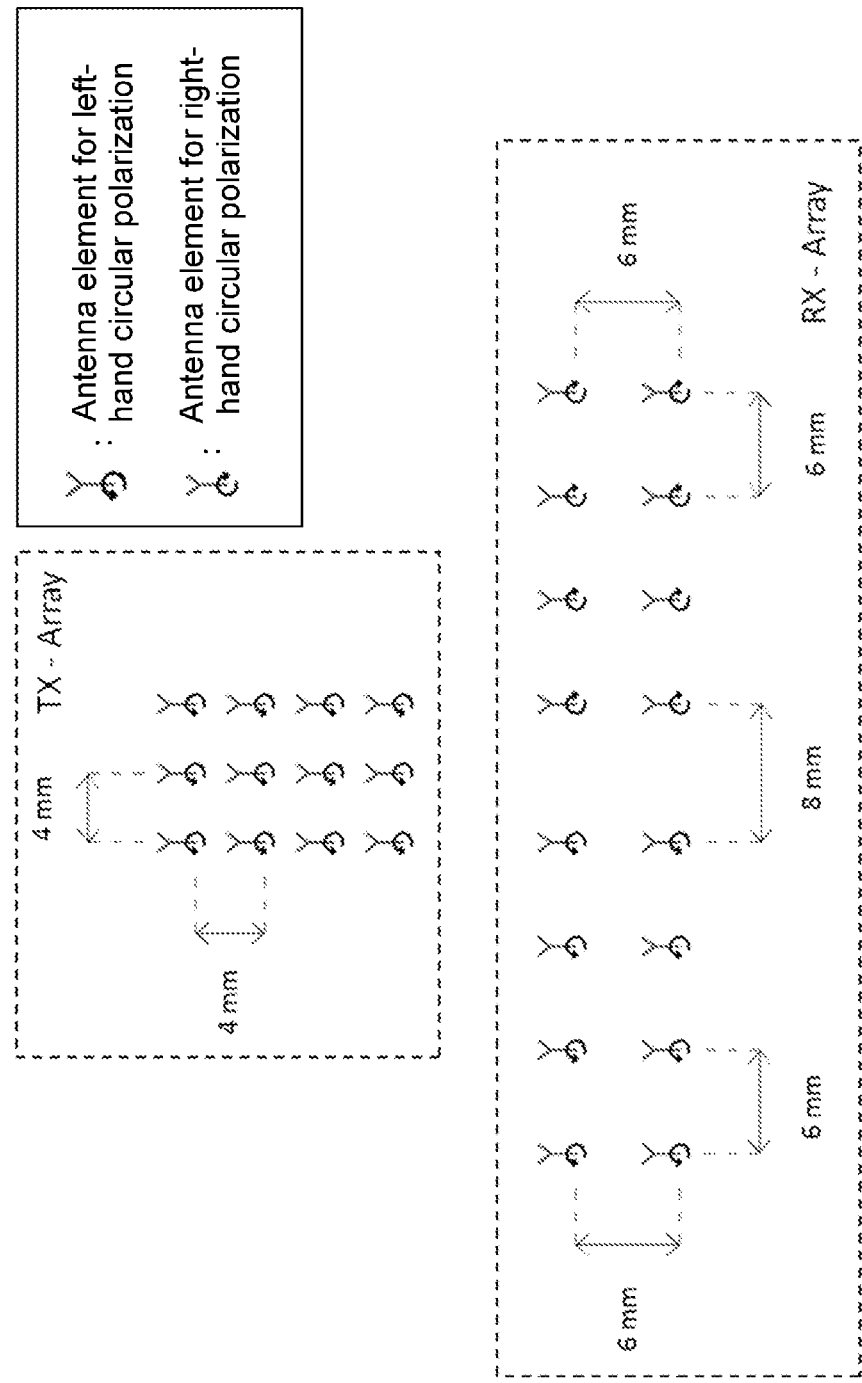
Figure 10: Exemplary embodiment of the transmission/reception arrangement

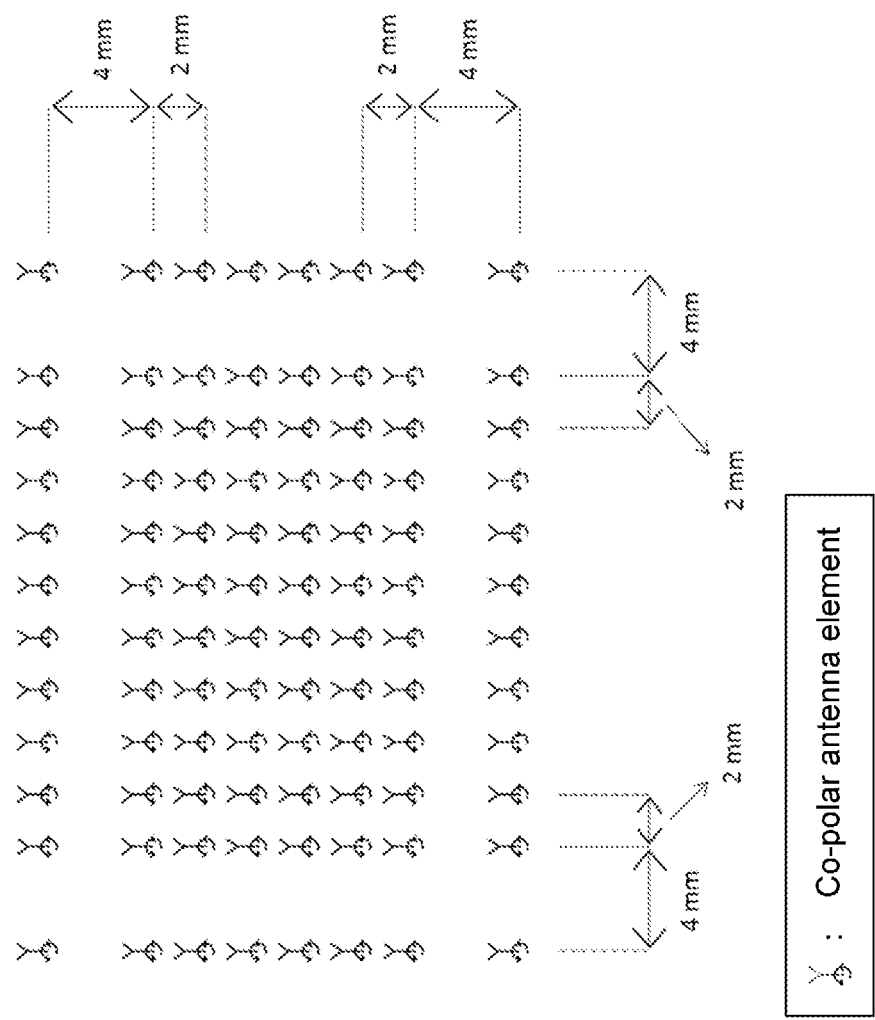
Figure 11: Co-polar overall arrangement of the polarimetric mode consisting of real and synthetic proportions for the arrangement in figure 10

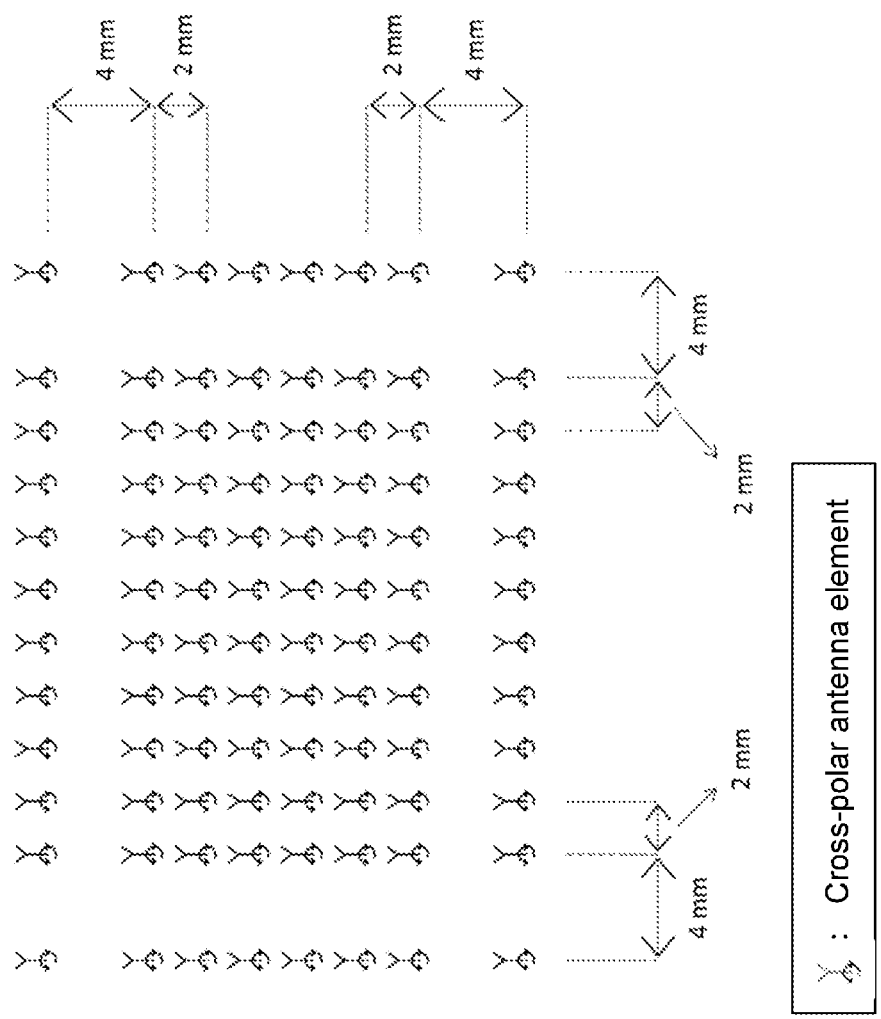
Figure 12: Cross-polar overall arrangement of the polarimetric mode consisting of real and synthetic proportions for the arrangement in figure 10

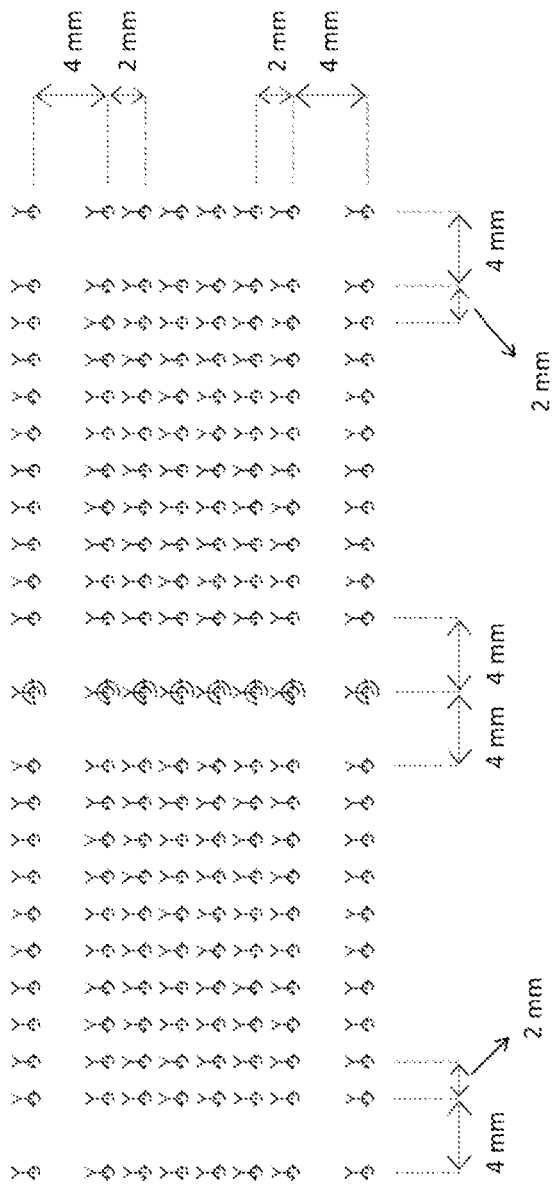
Figure 13: Overall arrangement for the mode having a high angular resolution in azimuth for the arrangement in figure 10

US 11,885,901 B2

POLARIMETRIC RADAR AND A SUITABLE USE AND METHOD THEREFOR

CROSS REFERENCE TO RELATED APPLICATIONS

This application is a National Phase entry of International Patent Application No. PCT/EP2019/057849, filed on Mar. 28, 2019 which claims priority to Application No. DE 102018209131.5, filed on Jun. 8, 2018, and Application No. DE 102018211610.5, filed on Jul. 12, 2018, the disclosures of which are hereby incorporated by reference in their entireties.

TECHNICAL FIELD

The present invention relates to a radar system with digital phase coding and circularly polarized carrier signals.

BACKGROUND

As is known, in autonomous driving that is sought in the future, the use of a plurality of radar sensors for each vehicle is necessary. In currently used FMCW (frequency-modulated continuous wave) signal modulation methods, instances of interference arise. These instances of interference cause a huge increase in the noise level, with the result that objects can no longer be identified. Concepts and strategies for preventing instances of interference prove difficult since, in terms of signal technology, compensation strategies have to be sought, for example in terms of frequency or by coordinated transmission cycles. However, these strategies come to their limits when many radar sensors and therefore many disturbing signals are present at the same time, as is the case, for example, in autonomous driving.

SUMMARY

It is the object of the present invention to prevent the disadvantages present in the prior art or to improve them in such a way that reliable object determination can be achieved.

This object is achieved in terms of a device and in terms of a use and a method disclosed herein.

BRIEF DESCRIPTION OF DRAWINGS

FIG. 1 is a schematic drawing of the transmission and reception principle.

FIG. 2 is a schematic drawing of the transmission and reception arrangement.

FIG. 3 is a schematic drawing of the co-polar overall array.

FIG. 4 is a schematic drawing of the cross-polar overall array.

FIG. 5 is a schematic drawing of the overall array.

FIG. 6 is a schematic drawing of the antenna configured as a double-ridged waveguide horn.

FIG. 7 is a schematic drawing of the antenna configured as a double-ridged waveguide horn.

FIG. 8 is a schematic drawing of the antenna configured as a horn waveguide.

FIG. 9 is a schematic drawing of the antenna configured as a horn waveguide.

FIG. 10 is a schematic drawing of the transmission and reception arrangement.

FIG. 11 is a schematic drawing of the co-polar overall array.

FIG. 12 is a schematic drawing of the cross-polar overall array.

FIG. 13 is a schematic drawing of the overall array.

DETAILED DESCRIPTION

In principle, it must additionally be stated that modulation methods in which the phase is modulated will be used increasingly in the future. This modulation method is referred to as PMCW (phase-modulated continuous wave). In this case, a plurality of transmission signals from various transmitters in the phase are modulated and, according to the application, transmitted simultaneously in accordance with the MIMO (multiple-input multiple-output) principle. The reception signals are assigned to the corresponding transmitters again after the signal processing. The measurement of the angular offset is then carried out in post-processing by means of the DBF (digital beam forming) method. The simultaneous use of a plurality of transmitters can generate a large antenna aperture, which makes a high angular resolution possible, even in the case of large distances. Furthermore, the simultaneous use of a plurality of transmitters produces a large signal amplitude and a large dynamic range (signal-to-noise ratio), with the result that object structures can be detected even in the case of large distances.

A further requirement of autonomous driving is, according to the application, the classification of objects. For this purpose, the use of circularly polarized waves is necessary. On the one hand, on account of the circularity of the wave, many back-scatter points are produced and the contour of the targets can be clearly identified as a result. Furthermore, a characteristic polarimetric pattern is obtained for each object. By means of artificial intelligence or machine learning methods, it is possible to develop algorithms that can classify high-precision objects. Furthermore, circularly polarized waves can be used to satisfy further requirements for autonomous driving, such as precise road condition identification, for example.

In order to be able to separate polarimetric effects at the target, even for large target distances, a high angular resolution and a large dynamic range is required. For this reason, the radar system according to the invention combines the aforementioned technologies: carrier signals having circularly polarized electromagnetic waves and a PMCW modulation method. The PMCW method produces still further advantages according to the invention. It is thus possible in terms of the method for radar systems to coordinate and/or communicate with one another additional information and functions within a group and/or with other radar systems by means of phase coding such as preferably:

temporal synchronization of a plurality of sensors
  optimized code selection when a plurality of radar sensors are operated in the same frequency range
  vehicle data such as, for example, braking behavior
  journeys including danger points
  traffic flow information.

Advantageous developments of the subject matter of the invention are achieved by way of the features of the dependent claims.

FIG. 1 shows the transmission and reception principle according to the invention. There are a plurality of transmitters ($TX_1$ to $TX_N$), which are operated simultaneously, wherein each transmitter is operated by way of a transmission signal that is modulated by way of an individual digital phase code, in accordance with the PMCW (phase-modulated continuous wave) method. This is followed by conversion of the digital signals to analog signals by means of a digital-to-analog converter (DAC) and upmixing into the frequency range between 76 and 81 GHz. Each transmitter now emits its individually coded signal, wherein the waves of the electromagnetic carrier signals that are emitted by the antennas are circularly polarized. In this case, the waveform can be left-hand circular or right-hand circular. The signals reflected back from the target objects reach the reception antennas. In this case, there are reception antennas that are configured for left-hand circular polarization and reception antennas that are configured for right-hand circular polarization. The reception signals are then downmixed into baseband and the analog signals are converted to digital signals by means of an analog-to-digital converter (ADC). This is followed by correlation for all reception channels, which makes it possible for each transmission signal to be able to be extracted at each receiver. Signal analyses are then carried out for the polarimetric mode according to the invention only for the left-hand circular and only for the right-hand circular reception channels. For the high-resolution mode according to the invention, the left-hand circular and the right-hand circular reception channels are evaluated together. Radar image data, including a 4D resolution in distance, speed, horizontal direction (azimuth) and vertical direction (elevation) are therefore obtained for the left-hand circular reception channels, for the right-hand circular reception channels and for the joint use of left-hand and right-hand circular reception channels. Further analysis then takes place. The radar image that contains the left-hand and right-hand circular reception channels is suitable for high-resolution algorithms. The radar images, which have reception channels with just one polarization, are suitable upon comparison for the analysis of polarimetric properties and applications based thereon such as, preferably, object classification and road condition determination.

FIG. 2 shows by way of example a transmission and reception arrangement according to the invention. In this case, all of the transmission antennas are configured for left-hand circular polarization. For the radar system according to the invention, all of the transmission antennas can also be configured for right-hand circular polarization. Furthermore, the same number of receivers are configured for left-hand circular polarization and for right-hand circular polarization, respectively.

FIG. 3 shows the co-polar overall array, consisting of real and synthetic antenna elements, the positions of which result through the arrangement in FIG. 2 in accordance with the MIMO (multiple-input multiple-output) principle. In this case, co-polar means that only the receivers that are configured for the same polarization as the transmitters are used for the signal analysis. Said signal analysis is part of the polarimetric mode. In FIG. 3, left-hand circularly polarized waves are emitted and receivers that are configured for left-hand circular polarization are used. In this case, a transmission/reception arrangement can be used, which generates a co-polar overall array that observes a certain distance rule, namely that the antenna element distance in the horizontal and in the vertical direction from the center to the edge of the antenna array at least remains identical and becomes greater at at least one position.

FIG. 4 shows the cross-polar overall array, consisting of real and synthetic antenna elements, the positions of which result through the arrangement in FIG. 2 in accordance with the MIMO principle. In this case, cross-polar means that only the receivers that are configured for the other polarization to the transmitters are used for the signal analysis. Said signal analysis is part of the polarimetric mode. In FIG. 4, left-hand circular waves are emitted and receivers that are configured for right-hand circular polarization are used. In this case, a transmission/reception arrangement can be used, which generates a cross-polar overall array that observes a certain distance rule, namely that the antenna element distance in the horizontal and in the vertical direction from the center to the edge of the antenna array at least remains identical and becomes greater at at least one position.

FIG. 5 shows the overall array for the mode having a high angular resolution in azimuth, the overall array consisting of real and synthetic antenna elements, the positions of which result through the arrangement in FIG. 2 in accordance with the MIMO principle, wherein both co-polar and cross-polar antenna elements are used. As a result, in the horizontal direction, a large antenna aperture is generated, which makes a high angular resolution in azimuth possible. In this case, polarimetric signal differences must be taken into account in the signal analysis in the layout function.

According to the invention, waveguide antennas, which are configured either for left-hand circular or for right-hand circular polarization, are used as antennas. These make possible a high degree of isolation between the polarization directions. This high degree of isolation is obligatory for the analysis of polarimetric properties. Furthermore, the waveguide technology makes exactly defined forms of the antenna phase centers possible, which are advantageous for the MIMO principle. In the following text, suitable structures of waveguide antennas are described.

FIG. 6 shows an antenna element configured as a double-ridged waveguide horn for left-hand circularly polarized waves. The antenna element has a connection consisting of a rectangular waveguide, which is configured for a H10 wave. This is followed by an adaptation structure that connects the rectangular waveguide to a quadratic waveguide. This is followed by a waveguide that has two laterally mounted ridges and is connected to the circular waveguide antenna aperture. Here, the two ridges act as metal phase shifters and are oriented at 45° to the rectangular waveguide. With this design, a left-hand circularly polarized wave at the circular waveguide antenna aperture is converted to a H10 wave at the antenna connection and vice versa.

FIG. 7 shows an antenna element, embodied as a double-ridged waveguide horn for right-hand circular polarization. The difference from the double-ridged waveguide horn in FIG. 6, which is configured for left-hand circular polarization, is that the positions of the ridges are located on the respective two other waveguide walls and are therefore offset by 90°.

FIG. 8 shows an antenna element, embodied as a horn waveguide with an integral septum for left-hand circularly polarized waves. The antenna element has a connection consisting of a rectangular waveguide that is configured for a H10 wave. This is followed by an adaptation structure, which connects the rectangular waveguide to a quadratic waveguide. This is followed by a waveguide in which a dielectric septum is located and which is connected to the circular waveguide antenna aperture. The septum acts as a dielectric phase shifter and is oriented at 45° to the rectangular waveguide. Furthermore, the septum is located within the circular waveguide antenna aperture and is connected to the radome. With this design, a left-hand circularly polarized wave at the circular waveguide antenna aperture is converted to a H10 wave at the antenna connection and vice versa.

FIG. 9 shows an antenna element, configured as a horn waveguide with an integral septum for right-hand circular polarization. The difference from the antenna element in FIG. 8, which is configured for left-hand circular polarization, is that the integral septum is located in the waveguide rotated by 90°.

FIG. 10 shows an exemplary embodiment of the transmission and reception arrangement. In this case, all of the transmission antennas are configured again for left-hand circular polarization. For the radar system according to the invention, all of the transmission antennas can also be configured for right-hand circular polarization. Furthermore, the same number of receivers are configured for left-hand circular polarization and for right-hand circular polarization, respectively.

FIG. 11 shows the co-polar overall array that consists of real and synthetic antenna elements, the positions of which result through the arrangement in FIG. 10 in accordance with the MIMO (multiple-input multiple-output) principle. In this case, co-polar means that only the receivers that are configured for the same polarization as the transmitters are used for the signal analysis. Said signal analysis is part of the polarimetric mode. In FIG. 11, left-hand circularly polarized waves are emitted and receivers that are configured for left-hand circular polarization are used. In this case, a transmission/reception arrangement can be used, which generates a co-polar overall array that observes a certain distance rule, namely that the antenna element distance in the horizontal and in the vertical direction from the center to the edge of the antenna array at least remains identical and becomes greater at at least one position.

FIG. 12 shows the cross-polar overall array that consists of real and synthetic antenna elements, the positions of which result through the arrangement in FIG. in accordance with the MIMO principle. In this case, cross-polar means that only the receivers that are configured for the other polarization to the transmitters are used for the signal analysis. Said signal analysis is part of the polarimetric mode. In FIG. 12, left-hand circular waves are emitted and receivers that are configured for right-hand circular polarization are used. In this case, a transmission/reception arrangement can be used, which generates a cross-polar overall array that observes a certain distance rule, namely that the antenna element distance in the horizontal and in the vertical direction from the center to the edge of the antenna array at least remains identical and becomes greater at at least one position.

FIG. 13 shows the overall array for the mode with a high angular resolution in azimuth, the overall array consisting of real and synthetic antenna elements, the positions of which result through the arrangement in FIG. 10 in accordance with the MIMO principle, wherein both co-polar and cross-polar antenna elements are used. As a result, in the horizontal direction, a large antenna aperture is generated, which makes a high angular resolution in azimuth possible. In this case, at least one antenna column is advantageously produced, as in FIG. 13, and/or at least one antenna row, in which co-polar and cross-polar antenna elements overlap. The differences between the co-polar and cross-polar antenna elements in phase and amplitude caused by antenna design and target state can be detected in terms of signal technology in FIG. 13 by means of the overlapping column and can be balanced in the further signal processing. This is necessary when co-polar and cross-polar antenna elements are used together, for example, in the beam forming process in the azimuth direction. It is necessary to accordingly correct the amplitudes and phases for each angle and range gate.

Said antenna column is used to calibrate phase and amplitude differences between the co-polar and the cross-polar antenna elements out of the overall arrangement or out of the overall array. This is a requirement for the joint use of co-polar and cross-polar antenna elements in the overall arrangement. The differences in amplitude and phase to be calibrated out arise, on the one hand, due to the antenna design and, on the other hand, due to the state of the targets.

Furthermore, it is advantageous in the signal processing to mathematically fill antenna element distances of the overall arrangement, which are significantly greater than half the wavelength of the carrier frequency. In this case, interpolation methods and/or autoregressive predictions are suitable. Using these methods, an additional increase in size of the aperture and therefore a further increase in the angular resolution can furthermore be achieved.

Advantageous developments are the subject matter of the dependent claims.

LIST OF REFERENCE SIGNS

TX: Transmission antennas
RX: Reception antennas
LO: Local oscillator
LHC: Left-hand circular (Left-hand circular polarization)
RHC: Right-hand circular (Right-hand circular polarization)
DAC: Digital-to-analog converter
ADC: Analog-to-digital converter
1: Rectangular waveguide, configured for a H10 wave
2: Adaptation structure
3: Waveguide, which has two laterally mounted ridges oriented at 45° to the rectangular waveguide
4: Circular waveguide antenna aperture
5: Waveguide in which a dielectric septum is located
6: Dielectric septum, which projects into the antenna, which is connected to the radome and which is oriented at 45° to the rectangular waveguide
7: Radome, which is located in front of the antenna

The invention claimed is:

1. A polarimetric radar comprising:
a plurality of transmitters forming a transmission arrangement, the transmission arrangement being configured so that carrier signals from the transmitters have a circular polarization, and during operation each transmitter is used simultaneously to provide a transmission signal that is modulated by an individual digital phase code; and
a plurality of reception antennas forming a receiver arrangement configured to receive, reflected signals, the reception antennas comprising reception antennas that are configured for left-hand circularly polarized electromagnetic waves and reception antennas configured for right-hand circularly polarized electromagnetic waves,
wherein the polarimetric radar is configured for multiple-input multiple-output operation.

2. The polarimetric radar of claim 1, wherein the receiver arrangement has an equal number of reception antennas configured for left-hand circularly polarized electromagnetic waves and reception antennas configured for right-hand circularly polarized electromagnetic waves.

3. The polarimetric radar of claim 1, wherein the polarimetric radar is configured for operation in at least two different modes, wherein, in at least a first mode of the at least two different modes, the polarimetric radar separately processes reception signals of the reception antennas configured for left-hand circular polarization and the reception signals of the reception antennas configured for right-hand circular polarization and analyzes differences between the separately processed reception signals.

4. The polarimetric radar of claim 1, wherein the polarimetric radar is configured for operation in at least two different modes, wherein, in at least a first mode of the at least two different modes, the polarimetric radar analyzes high angular resolutions by processing together reception signals from the reception antennas that are configured for left-hand circular polarization and the reception antennas that are configured for right-hand circular polarization, which together form an overall arrangement in accordance with the multiple-input multiple-output operation.

5. The polarimetric radar of claim 4, wherein within the overall arrangement, the plurality of reception antennas comprises at least one column of antenna elements and/or at least one row of antenna elements comprising overlapping reception antennas configured for left-hand circular polarization and reception antennas configured for right-hand circular polarization overlap, and the polarimetric radar is configured to account for signal differences in amplitude and phase when processing signals from the overlapping reception antennas.

6. The polarimetric radar of claim 1, wherein the polarimetric radar is configured to sequentially operate in a plurality of modes comprising a first mode for object classification and road condition determination and a second mode for high angular resolution for location determination of target objects.

7. The polarimetric radar of claim 1, wherein in at least one mode of operation in which polarimetric properties are analyzed, a distance between individual antenna elements of the reception antennas is identical from a center to an edge of the receiver arrangement and/or increases at at least one position.

8. The polarimetric radar of claim 1, wherein the antennas are horn antennas.

9. The polarimetric radar of claim 8, wherein the horn antennas comprise metal phase shifters or dielectric phase shifters.

10. The polarimetric radar of claim 8, wherein the horn antennas are double-ridged waveguide horns.

11. The polarimetric radar of claim 10, wherein the double-ridged waveguide horns comprises two laterally mounted ridges arranged at 45° to a rectangular waveguide functioning as antenna connection.

12. The polarimetric radar of claim 8, wherein the horn antennas each comprise an integral septum connected to an antenna radome and arranged at 45° to a rectangular waveguide functioning as antenna connection.

13. The polarimetric radar of claim 8, comprising a circular waveguide configured as an antenna aperture.

14. A method comprising:
providing the polarimetric radar of claim 1 on a car; and
operating the polarimetric radar in a frequency range between 76 GHz and 81 GHz.

15. A method, comprising:
determining information about an object using the polarimetric radar of claim 1 in coordination with at least one other radar.

16. The method of claim 15, wherein determining the information comprises temporally synchronizing a plurality of sensors.

17. The method of claim 15, wherein determining the information comprises operating a plurality of radar sensors in a common frequency range and selecting optimized code from the radar sensors.

18. The method of claim 15, wherein the information comprises vehicle data.

19. The method of claim 15, wherein the information comprises information about a journey.

20. The method of claim 15, wherein the information comprises traffic flow information.

* * * * *